US012269276B2

(12) United States Patent
Suksiri et al.

(10) Patent No.: US 12,269,276 B2
(45) Date of Patent: Apr. 8, 2025

(54) INKJET PRINTER

(71) Applicant: Roland DG Corporation, Hamamatsu (JP)

(72) Inventors: Bandhit Suksiri, Hamamatsu (JP); Masayoshi Kimura, Hamamatsu (JP); Shinya Yamamoto, Hamamatsu (JP); Takashi Adachi, Hamamatsu (JP); Hirohito Nihashi, Hamamatsu (JP); Ryugo Nimura, Hamamatsu (JP)

(73) Assignee: ROLAND DG CORPORATION, Shizuoka (JP)

( * ) Notice: Subject to any disclaimer, the term of this patent is extended or adjusted under 35 U.S.C. 154(b) by 95 days.

(21) Appl. No.: 18/112,002

(22) Filed: Feb. 21, 2023

(65) Prior Publication Data

US 2023/0264484 A1 Aug. 24, 2023

(30) Foreign Application Priority Data

Feb. 22, 2022 (JP) ................................. 2022-025778

(51) Int. Cl.

*B41J 2/21* (2006.01)
*B41J 2/165* (2006.01)
*B41J 29/393* (2006.01)

(52) U.S. Cl.

CPC ......... *B41J 2/2142* (2013.01); *B41J 2/16579* (2013.01); *B41J 29/393* (2013.01); *B41J 2029/3935* (2013.01)

(58) Field of Classification Search

CPC ...... B41J 29/393; B41J 2/2142; B41J 19/145; B41J 2/16579; B41J 2002/16573; B41J 29/38; B41J 2029/3935; B41J 2/16517; B41J 2/0451; B41J 2/2139

See application file for complete search history.

(56) References Cited

U.S. PATENT DOCUMENTS

2018/0134032 A1 5/2018 Nozawa

FOREIGN PATENT DOCUMENTS

| | | | |
|---|---|---|---|
| EP | 2 468 515 | A1 | 6/2012 |
| JP | 2004-009474 | A | 1/2004 |
| JP | 2016-185688 | A | 10/2016 |

OTHER PUBLICATIONS

Official Communication issued in corresponding European Patent Application No. 23157514.3, mailed on Jul. 12, 2023.

*Primary Examiner* — Jannelle M Lebron
(74) *Attorney, Agent, or Firm* — Keating & Bennett, LLP

(57) ABSTRACT

A test image printer of an inkjet printer causes a test image, including a mark with a predefined shape and usable to correct an image captured by an image capturing device, and a test pattern usable to inspect a plurality of nozzles, to be printed on a recording medium. An image capture controller controls the image capturing device to capture an image of the test image printed on the recording medium. A corrector compares the image of the mark captured by the image capturing device, to the predefined shape of the mark, to calculate a correction value, and corrects the image of the test pattern, captured by the image capturing device, based on the calculated correction value. An inspector inspects the plurality of nozzles based on the image of the test pattern corrected by the corrector.

7 Claims, 5 Drawing Sheets

INKJET PRINTER

CROSS REFERENCE TO RELATED APPLICATION

This application claims the benefit of priority to Japanese Patent Application No. 2022-25778 filed on Feb. 22, 2022. The entire contents of this application are hereby incorporated by reference herein.

BACKGROUND OF THE INVENTION

1. Field of the Invention

The present invention relates to an inkjet printer.

2. Description of the Related Art

An inkjet printer printing a test pattern for inspecting an ink injection error on a recording medium is conventionally known. For example, Japanese Laid-Open Patent Publication No. 2004-009474 discloses an inkjet printer printing a test pattern including a plurality of lines on a recording medium and reading the test pattern by a scanner. Japanese Laid-Open Patent Publication No. 2004-009474 describes that the number of the lines read by the scanner is compared against the number of lines that should be included in the test pattern to determine whether or not there is a nozzle that does not inject ink.

In order to perform a more precise inspection than by the inkjet printer described in Japanese Laid-Open Patent Publication No. 2004-009474, for example, an inspection of specifying the nozzle that does not inject ink, it is required that an image of the test pattern to be read by the inkjet printer should be more precise. However, in actuality, an image of the test pattern captured by an image capturing device is, for example, enlarged, shrunk or distorted in many cases (hereinafter, such a difference between the image captured by the image capturing device and the actual test pattern will be collectively referred to as "image incorrectness"). Due to such image incorrectness, it is difficult to accurately specify a portion of the test pattern that corresponds to each of nozzles. This makes it difficult to specify, by an inkjet printer, the nozzle causing an injection error.

SUMMARY OF THE INVENTION

Preferred embodiments of the present invention provide inkjet printers each operable to inspect a state of nozzles more precisely based on an image of a test pattern captured by an image capturing device, by reducing or preventing an influence of image incorrectness.

An inkjet printer according to a preferred embodiment of the present invention includes a recording head including a plurality of nozzles to inject ink toward a recording medium, an image capturing device to capture an image of the recording medium, and a controller. The controller is configured or programmed to include a test image printer, an image capturer controller, a corrector, and an inspector. The test image printer is operable to control the recording head to print, on the recording medium, a test image including a mark of a predefined shape usable to correct an image captured by the image capturing device and a test pattern usable to inspect the state of the plurality of nozzles. The image capture controller is operable to control the image capturing device to capture an image of the test image printed on the recording medium. The corrector is operable to compare the image of the mark captured by the image capturing device against the predefined shape of the mark to calculate a correction value, and correct the image of the test pattern, captured by the image capturing device, based on the calculated correction value. The inspector is operable to inspect the state of the plurality of nozzles based on the image of the test pattern corrected by the corrector.

According to an inkjet printer of a preferred embodiment of the present invention, incorrectness of the image of the test pattern is corrected with the correction value calculated by a comparison of the image of the mark captured by the image capturing device and the predefined shape of the mark. Therefore, the inkjet printer suppresses an influence of the incorrectness of the image and thus inspects the state of the nozzles more precisely.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
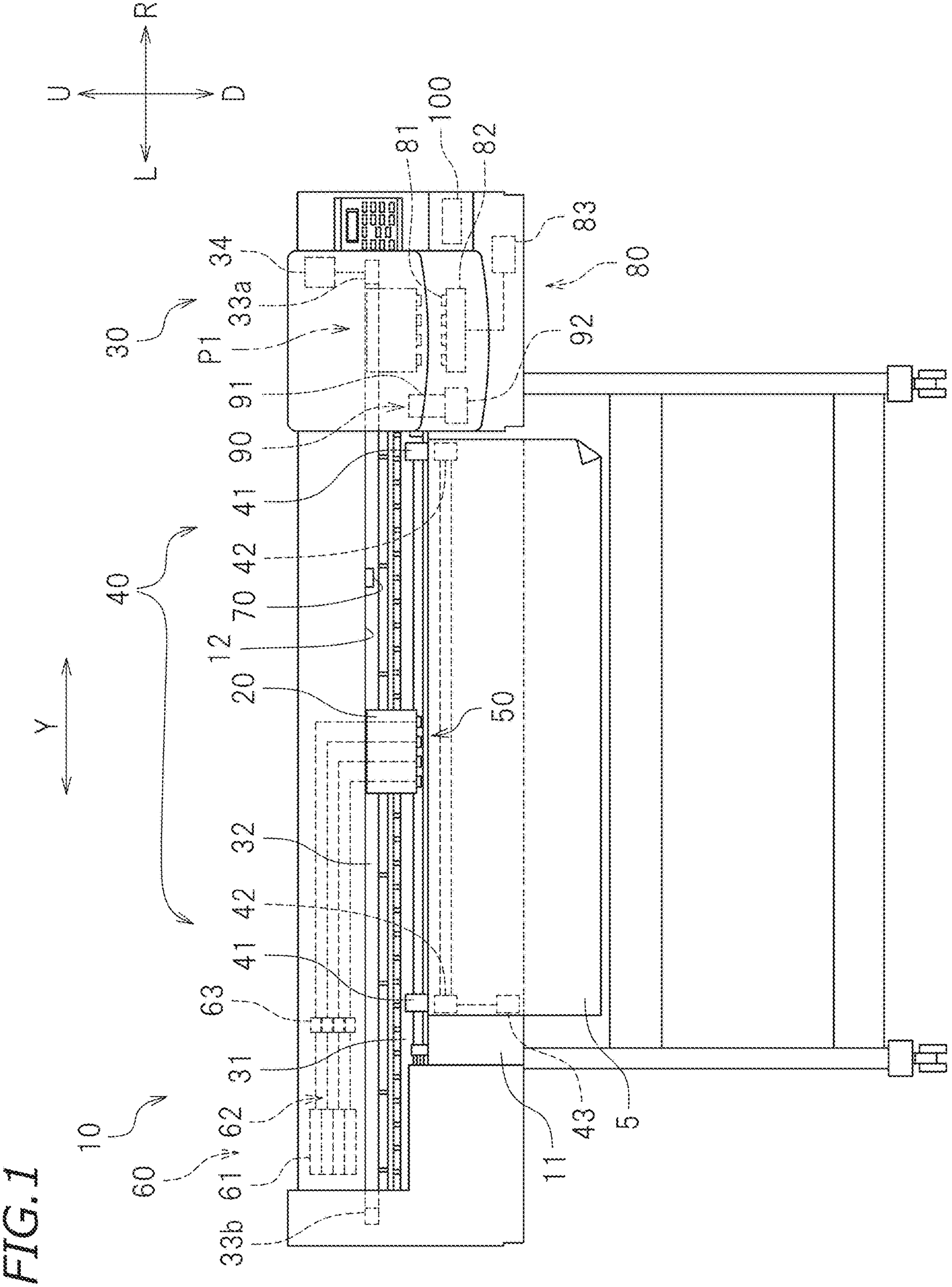
FIG. 1 is a front view of an inkjet printer according to a preferred embodiment of the present invention.

Hereinafter, inkjet printers according to preferred embodiments will be described with reference to the drawings. Needless to say, the preferred embodiments described herein are not intended to limit the present invention. Components and portions having the same functions will bear the same reference signs, and overlapping descriptions will be omitted or simplified when appropriate. In the following description, where the inkjet printer is seen at a position facing a front surface thereof, a direction distancing away from the inkjet printer is referred to "forward", and a direction approaching the inkjet printer is referred to as "rearward". In the drawings, letters F, Rr, L, R, U and D respectively represent "front", "rear", "left", "right", "up" and "down". It should be noted that these directions are provided merely for the sake of explanation, and do not limit the manner of installation or the like of the inkjet printer.

FIG. 1 is a front view of a large-scale inkjet printer 10 (hereinafter, referred to as a "printer") according to a preferred embodiment. The printer 10 moves a roll-shaped recording medium 5 in a front-rear direction while injecting ink from a recording head 50 mounted on a carriage 20 movable in a left-right direction, so as to form an image on the recording medium 5. Hereinafter, the direction in which the carriage 20 is movable will be referred to also as a "main scanning direction Y", and the direction in which the recording medium 5 is movable will be referred to also as a "sub scanning direction X" (see FIG. 2). In this preferred embodiment, the main scanning direction Y is the left-right direction. In this preferred embodiment, the sub scanning direction X is the front-rear direction. The main scanning direction Y and the sub scanning direction X are perpendicular to each other.

The recording medium 5 is a target on which an image is to be printed. There is no specific limitation on the type of the recording medium 5. The recording medium 5 may be, for example, paper such as plain paper, inkjet printing paper or the like, or a transparent sheet formed of a resin, glass or the like. The recording medium 5 may be a sheet formed of a metal material, a rubber or the like, or cloth.

As shown in FIG. 1, the printer 10 includes the recording head 50, an ink supply device 60 to supply ink to the recording head 50, the carriage 20 to hold the recording head 50, a carriage moving device 30 to move the carriage 20 in the main scanning direction Y, a transportation device 40 to move the recording medium 5 in the sub scanning direction X, a capping device 80 to cap the recording head 50, a wiping device 90 to wipe the recording head 50, an image capturing device 70 to capture an image formed by the recording head 50, and a controller 100.

The carriage moving device 30 includes a guide rail 31, a belt 32, right and left pulleys 33*a* and 33*b*, and a carriage motor 34. The carriage 20 is in slidable engagement with the guide rail 31. The guide rail 31 extends in the main scanning direction Y. The guide rail 31 guides the carriage 20 to move in the main scanning direction Y. The belt 32 is secured to the carriage 20. The belt 32 is an endless belt. The belt 32 is wound along the pulley 33*a* provided to the right of the guide rail 31 and the pulley 33*b* provided to the left of the guide rail 31. The carriage motor 34 is attached to the right pulley 33*a*. When the carriage motor 34 is driven, the pulley 33*a* rotates and the belt 32 runs. As a result, the carriage 20 moves in the main scanning direction Y along the guide rail 31.

A platen 11 is located below the carriage 20. The platen 11 extends in the main scanning direction Y and the sub scanning direction X. On the platen 11, the recording medium 5 is to be placed. The transportation device 40 moves the recording medium 5 on the platen 11 in the sub scanning direction X. The transportation device 40 includes pinch rollers 41, grit rollers 42, and a feed motor 43. The pinch rollers 41 are provided above the platen 11, and press down the recording medium 5 from above. The pinch rollers 41 are located to the rear of the carriage 20. The platen 11 is provided with the grit rollers 42. The grit rollers 42 are located below the pinch rollers 41. The grit rollers 42 are located at positions facing the pinch rollers 41. The grit rollers 42 are coupled with the feed motor 43. The grit rollers 42 are rotatable upon receiving a driving force of the feed motor 43. When the grit rollers 42 rotate in a state where the recording medium 5 is held between the pinch rollers 41 and the grit rollers 42, the recording medium 5 is transported in the sub scanning direction X.

Figure 2:
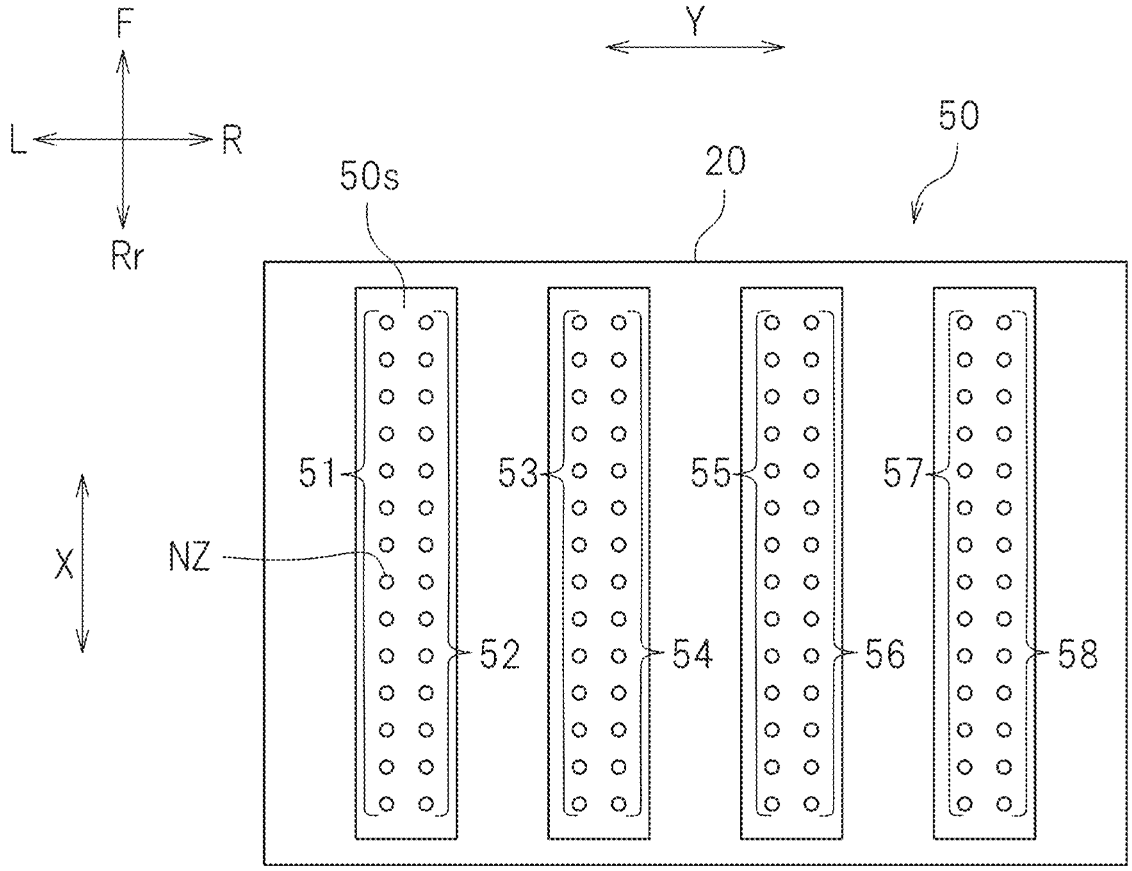
FIG. 2 is a plan view schematically showing a structure of a bottom surface of a carriage.

FIG. 2 is a plan view schematically showing a structure of a bottom surface of the carriage 20. The recording head 50 includes a plurality of nozzles NZ to inject ink. The plurality of nozzles NZ are arranged to define a plurality of nozzle columns 51 through 58 extending in the sub scanning direction X. The plurality of nozzle columns 51 through 58 each include plural nozzles NZ, among the plurality of nozzles NZ, arranged in a line the sub scanning direction X at a predetermined pitch. The plurality of nozzle columns 51 through 58 are arranged side by side in the main scanning direction Y. The length, number, and positional arrangement of the plurality of nozzle columns, the pitch of the nozzles NZ, the type and color of the ink to be injected from each of the nozzles NZ, and the like are predefined in accordance with, for example, the model of the printer 10. Hereinafter, the nozzle columns 51 through 58 will be referred to also as the "first nozzle column 51 through the eighth nozzle column 58". A surface of the recording head 50 in which the plurality of nozzles NZ are provided will be referred to also as a "nozzle surface 50S".

The ink supply device 60 supplies ink to the recording head 50. As shown in FIG. 1, the ink supply device 60 includes a plurality of ink cartridges 61 each accommodating ink, a plurality of ink flow passages 62, and a plurality of feed pumps 63 respectively provided in the ink flow passages 62. One ink cartridge 61 is connected with the nozzles NZ in one nozzle column via one ink flow passage 62. The feed pumps 63 feed ink in the ink cartridges 61 to the recording head 50. In this preferred embodiment, the ink supply device 60 supplies ink of a plurality of colors to the recording head 50. The plurality of ink cartridges 61 accommodate the ink of the plurality of colors respectively. There is no specific limitation on the type of the ink. The ink may be, for example, sorbent-based pigment ink or aqueous pigment ink. Alternatively, the ink may be aqueous dye ink, ultraviolet-curable pigment ink curable upon receiving ultraviolet rays, or the like.

The image capturing device 70 captures an image of the recording medium 5. In this preferred embodiment, the image capturing device 70 captures an image of the recording medium 5 placed on the platen 11. Alternatively, the image capturing device 70 may capture an image of the recording medium 5 at a site other than on the platen 11. As shown in FIG. 1, the image capturing device 70 is provided on a panel 12 above the guide rail 31. The image capturing device 70 is provided so as to face the platen 11. The image capturing device 70 includes, for example, a camera. In this preferred embodiment, the image capturing device 70 captures an image of a test image 200 (see FIG. 5), which is printed on the recording medium 5 and usable to inspect the state of the nozzles NZ.

As shown in FIG. 1, a home position P1 is set at a right end of a range in which the carriage 20 is movable. The home position P1 is a position at which the carriage 20 is located while waiting for printing. The capping device 80 is located below the carriage 20 at the home position P1. As shown in FIG. 1, the capping device 80 includes caps 81, a cap moving device 82, and a suction pump 83.

The caps 81 are attached to the recording head 50 to protect the recording head 50. The caps 81 each have a shape of a container having a top opening. The caps 81 are formed of, for example, a rubber. When the caps 81 are attached to the recording head 50, top edges of the caps 81 are put into close contact with the nozzle surface 50S of the recording head 50. The caps 81 are supported by the cap moving device 82. The cap moving device 82 attaches the caps 81 to, or separates the caps 81 from, the recording head 50. The suction pump 83 is connected with the caps 81. The suction pump 81 reduces an inner pressure of the caps 81 while the caps 81 are attached to the recording head 50. In this manner, the suction pump 81 suctions ink from the recording head 50.

The wiping device 90 is a device that wipes the nozzle surface 50S of the recording head 50. As shown in FIG. 1, the wiping device 90 includes a wiper 91 and a wiper moving device 92. In this preferred embodiment, the wiper 91 has a plate-shaped structure extending in an up-down direction and the main scanning direction Y. The wiper 91 is formed of, for example, a rubber. The wiper moving device 92 moves the wiper 91 in the sub scanning direction X while holding the wiper 91. The wiping device 90 moves the wiper

91 with the wiper moving device 91 while the wiper 91 is in contact with the nozzle surface 50S of the recording head 50 to cause the wiper 91 to wipe the nozzle surface 50S.

The capping device 80 and the wiping device 90, and also the recording head 50, are included in a cleaning device cleaning the recording head 50. The cleaning device may perform any of a plurality of levels of cleaning on the recording head 50, for example, mere flushing of causing ink to be injected from, and by, the recording head 50, wiping performed by the wiping device 90, ink suctioning performed by the capping device 80, or any combination thereof.

Figure 3:
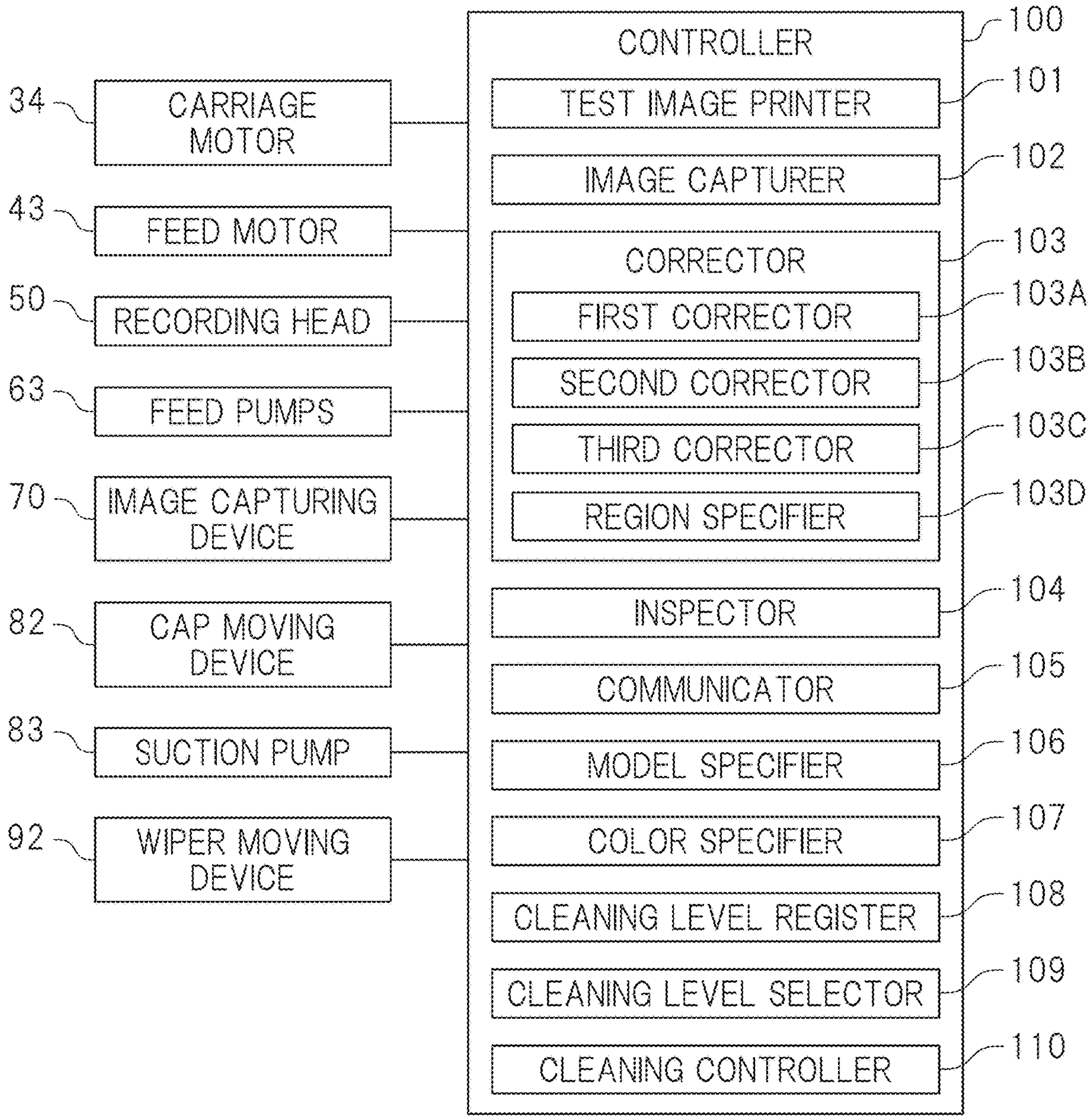
FIG. 3 is a block diagram of the printer.

FIG. 3 is a block diagram of the printer 10 according to this preferred embodiment. As shown in FIG. 3, the controller 100 is electrically connected with the carriage motor 34, the feed motor 43, the recording head 50, the feed pumps 63, the image capturing device 70, and the cap moving device 82, the suction pump 83 and the wiper moving device 92, and controls operations of these components. There is no specific limitation on the configuration of the controller 100. The controller 100 is, for example, a microcomputer. There is no specific limitation on the hardware configuration of the microcomputer. For example, the microcomputer includes an interface (I/F) to receive printing data or the like from an external device such as a host computer or the like, a central processing unit (CPU) to execute instructions of a control program, a ROM (read only memory) to store programs to be executed by the CPU, a RAM (random access memory) usable as a working area where the programs are developed, and a storage device such as a memory or the like that stores the above-described programs and various types of data. The controller 100 does not need to be provided in the printer 10. For example, the controller 100 may be a computer or the like installed outside the printer 10 and communicably connected with the printer 10 in a wired or wireless manner.

As shown in FIG. 3, the controller 100 includes, as processors to perform inspection on the state of the nozzles NZ and cleaning, a test image printer 101, an image capturer 102, a corrector 103, an inspector 104, a communicator 105, a model specifier 106, a color specifier 107, a cleaning level register 108, a cleaning level selector 109, and a cleaning controller 110. The controller 100 may include another controller(s). Herein, such another controller(s) will not be shown or described.

The test image printer 101 controls the recording head 50, the carriage moving device 30 and the transportation device 40 to cause the test image 200 to be printed on the recording medium 5. The test image 200 includes a mark 210 of a predefined shape usable to correct an image captured by the image capturing device 70 and also includes a test pattern 220 usable to inspect the state of the plurality of nozzles NZ (see FIG. 5). In this preferred embodiment, the test image printer 101 stacks ink injected from the nozzles NZ in two or more nozzle columns among the plurality of nozzle columns 51 through 58 to form the mark 210. This decreases the possibility that a part of the mark 210 is missing due to a nozzle NZ causing an injection error.

In this preferred embodiment, the mark 210 includes a portion having a predefined length in the main scanning direction Y (hereinafter, referred to as a "first comparison portion 211"; see FIG. 6), a portion having a predefined length in the sub scanning direction X (hereinafter, referred to as a "second comparison portion 212"; see FIG. 6), and a portion having a predefined extension direction (hereinafter, referred to as a "third comparison portion 213"; see FIG. 6). In this preferred embodiment, the mark 210 also includes a model display portion 214 (see FIG. 6) representing the model of the printer 10, and the test image printer 101 causes the mark 210 including the model display portion 214 to be printed. The test image 200 will be described in detail below.

The image capturer 102 controls the image capturing device 70 to capture an image of the test image 200 printed on the recording medium 5.

The corrector 103 compares the image of the mark 210 captured by the image capturing device 70 against a predefined shape of the mark 210 to calculate a correction value, and corrects the image of the test pattern 220 captured by the image capturing device 70 based on the correction value. Herein, the expression "corrects the image of the test pattern 220 captured by the image capturing device 70" indicates decreasing a difference between an image to be captured in the case where no incorrectness due to the image capturing device 70 is assumed to be present and the image actually captured by the image capturing device 70. The above expression encompasses a case where the "image to be captured" is corrected. The "correction" is a process of allowing the image to be captured and the image actually captured by the image capturing device 70 to be closer to each other.

As shown in FIG. 3, the corrector 103 includes a first corrector 103A, a second corrector 103B, a third corrector 103C, and a region specifier 103D. The first corrector 103A compares the length, in the main scanning direction Y, of the image of the first comparison portion 211 captured by the image capturing device 70 against the predefined length, in the main scanning direction Y, of the first comparison portion 211 to calculate a first correction value, with which the length, in the main scanning direction Y, of the image of the test pattern 220 is to be corrected. The first corrector 103A is a corrector that corrects the length, in the main scanning direction Y, of the image captured by the image capturing device 70. The first correction value is a correction value with which the length, in the main scanning direction Y, of the image captured by the image capturing device 70 is to be corrected.

The second corrector 103B compares the length, in the sub scanning direction X, of the image of the second comparison portion 212 captured by the image capturing device 70 against the predefined length, in the sub scanning direction X, of the second comparison portion 212 to calculate a second correction value, with which the length, in the sub scanning direction X, of the image of the test pattern 220 is to be corrected. The second corrector 103B is a corrector that corrects the length, in the sub scanning direction X, of the image captured by the image capturing device 70. The second correction value is a correction value with which the length, in the sub scanning direction X, of the image captured by the image capturing device 70 is to be corrected. Such a deviation in the length in each of the main scanning direction Y and the sub scanning direction X of the image captured by the image capturing device 70 is mainly caused by a distortion of the image captured by the image capturing device 70.

The third corrector 103C compares the extension direction of the image of the third comparison portion 213 captured by the image capturing device 70 against the predefined extension direction of the third comparison portion 213 to calculate a third correction value, with which the inclination of the image of the test pattern 220 is to be corrected. The third corrector 103C is a corrector that corrects the inclination of the image captured by the image capturing device 70. The third correction value is a correction value with which the inclination of the image captured by the image capturing device 70 is to be corrected. Such a deviation in the inclination of the image captured by the image capturing device 70 is mainly caused by a deviation in the manner of installation of the image capturing device 70. In this preferred embodiment, correction values calculated by the corrector 103 includes the first correction value, the second correction value and the third correction value.

The region specifier 103D corrects coordinates of a predefined region where the test pattern 220 is to be printed, with the calculated correction values, to specify a region where the test pattern 220 is present in the image captured by the image capturing device 70. This process will be described in detail below.

The inspector 104 inspects the state of the plurality of nozzles NZ based on the image of the test pattern 220 corrected by the corrector 103. In this preferred embodiment, the inspector 104 determines whether or not each of the nozzles NZ is good or defective, and calculates the ratio of the defective nozzles in each of the nozzle columns 51 through 58 based on the determination results (hereinafter, the ratio will be referred to also as the "defective nozzle ratio").

The communicator 105 is communicable with a communication terminal used by a user of the printer 10. The communicator 105, for example, transmits the results of the inspection performed by the inspector 104 to the communication terminal of the user, and receives an instruction thereto from the user. There is no specific limitation on the type of the communication terminal of the user. The communication terminal is, for example, a smartphone or a personal computer. There is no specific limitation on the type of information transmitted between the communicator 105 and the user. An example of such information will be described below.

The communicator 105 also communicates with a database including model information on the printer 10. In this preferred embodiment, information on a positional arrangement in the test pattern 220 is registered in the database in association with each of various models of the printer 10. In more detail, the color of the ink to be injected from the nozzles NZ in each of the nozzle columns in the recording head 50 is registered, as the information in the database, in association with each of various models of the printer 10. This allows the printer 10 to determine the order of colors in the test pattern 220.

The model specifier 106 specifies the model of the printer 10 based on the image of the model display portion 214 captured by the image capturing device 70. The color specifier 107 specifies the position of each of the colors in the test pattern 220 based on the model of the printer 10 specified by the model specifier 106 and the information on the positional arrangement in the test pattern 220 registered in the database in association with each of various models. In this preferred embodiment, the color specifier 107 specifies the order of the colors in the test pattern 220.

In the cleaning level register 108, a plurality of levels of cleaning to be performed by the cleaning device (including, in this preferred embodiment, the recording head 50, the capping device 80 and the wiping device 90) is registered. The cleaning level selector 109 selects one of the plurality of levels of cleaning registered in the cleaning level register 108, in accordance with the state of the plurality of nozzles NZ determined by the inspection performed by the inspector 104. The cleaning controller 110 controls the recording head 50, the capping device 80 and the wiping device 90 included in the cleaning device to clean the recording head 50 at the level selected by the cleaning level selector 109.

Figure 4:
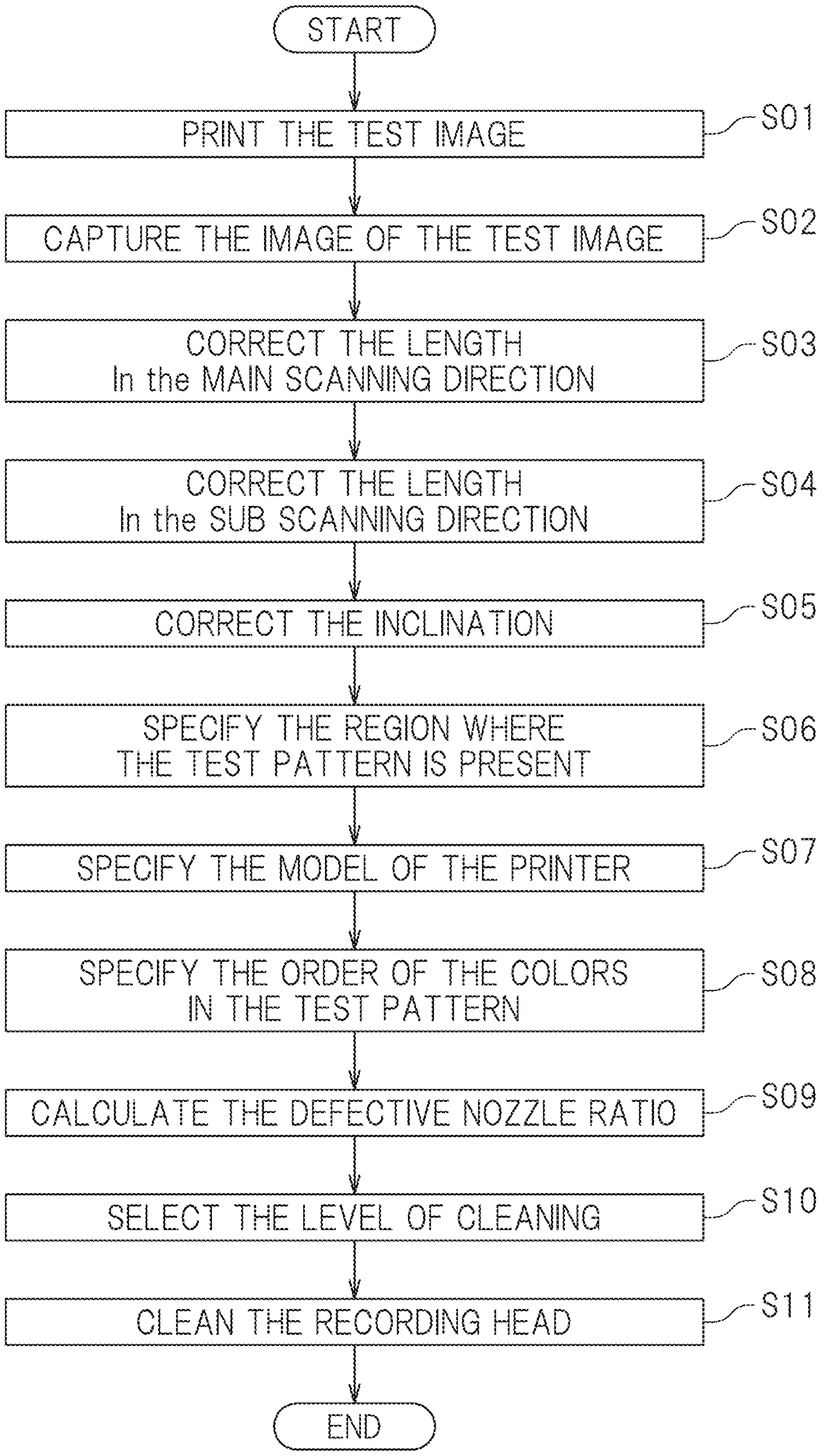
FIG. 4 is a flowchart showing an example of automatic inspection and automatic cleaning performed on a recording head.
Figure 5:
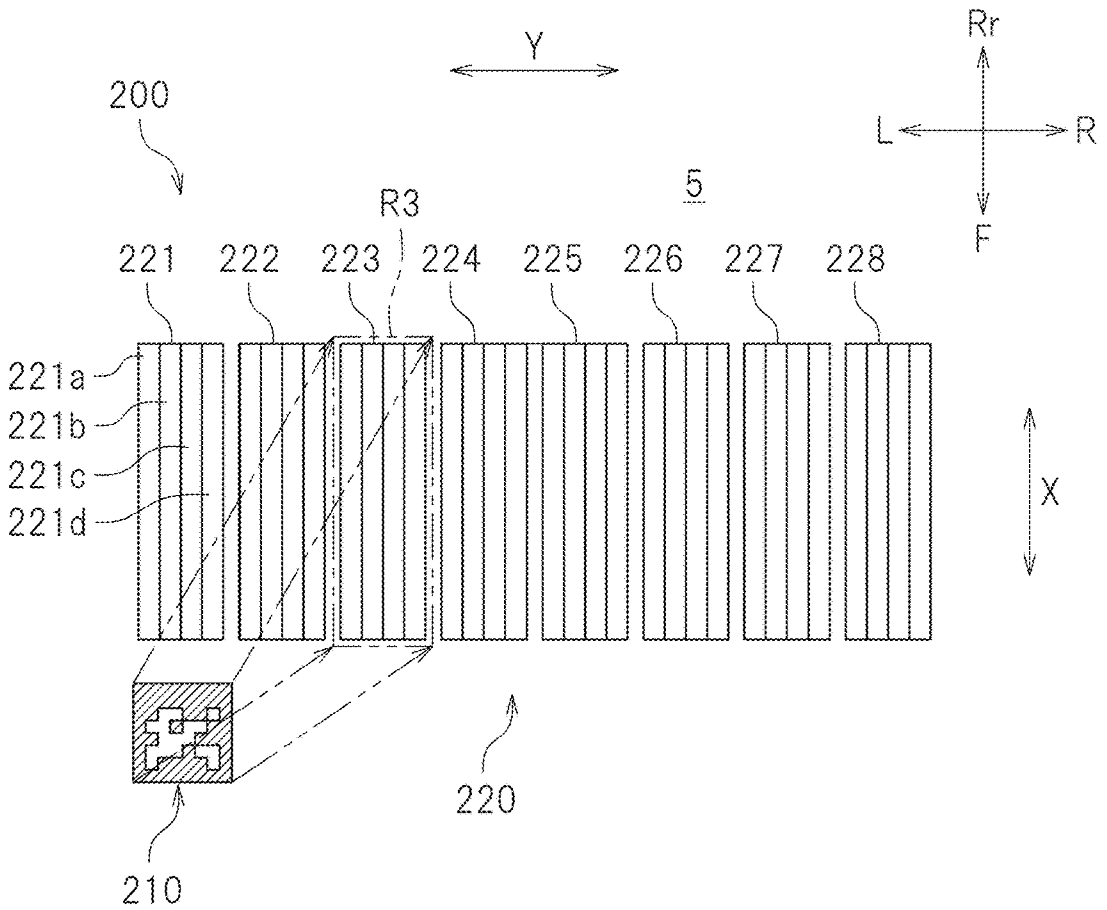
FIG. 5 is a plan view showing an example of test image.

Hereinafter, a process of automatic inspection and automatic cleaning on the recording head 50 will be described. FIG. 4 is a flowchart showing an example of automatic inspection and automatic cleaning on the recording head 50. As shown in FIG. 4, in step S01 of an example of automatic inspection and automatic cleaning on the recording head 50, the test image 220 is printed on the recording medium 5. FIG. 5 is a plan view showing an example of test image 200. As shown in FIG. 5, the test image 200 includes the mark 210 usable to correct the image captured by the image capturing device 70 and the test pattern 220 usable to inspect the state of the nozzles NZ. As the test pattern 220, any of various known test patterns is usable with no specific limitation. In this preferred embodiment, the test pattern 220 includes a first test pattern 221 through an eighth test pattern 228 respectively formed of ink injected from the nozzles NZ in the first nozzle column 51 through the eighth nozzle column 58. The first test pattern 221 through the eighth nozzle pattern 228 are arranged side by side in this order in the main scanning direction Y.

In the example shown in FIG. 5, magenta ink is injected from the plurality of nozzles NZ in the first nozzle column 51. Yellow ink, cyan ink, black ink, black ink, cyan ink, yellow ink and magenta ink are respectively injected from the nozzles NZ in the second nozzle column 52 through the eighth nozzle column 58. The first test pattern 221 includes a first island 221*a* formed of magenta ink lines injected from every fourth nozzles NZ in the first nozzle column 51 and extending the main scanning direction Y, a second island 221*b* formed of the magenta ink lines injected from every fourth nozzles NZ adjacent, in the sub scanning direction X, to the nozzle NZ injecting the magenta ink forming the first island 221*a*, and a third island 221*c* and a fourth island 221*d* formed in substantially the same manner. It is inspected whether each of the ink lines included in the first test pattern 221 is present or absent, so that the defective nozzle ratio of the first nozzle column 51 is calculated. The second test pattern 222 through the eighth test pattern 228 are structured in the same manner except for the color of the ink.

The test pattern 220 is not limited to having the above-described structure. The test pattern 220 may have any structure with no specific limitation as long as dots of ink injected from all the nozzles NZ are separate from each other.

The mark 210 has a predefined shape and is located so as not to overlap the test pattern 220. In this preferred embodiment, the mark 210 is formed of a stack of ink injected from the nozzles NZ in the plurality of nozzle columns. This decreases the possibility that a portion of the mark 210 is missing due to a nozzle NZ causing an injection error. FIG. 6 is a plan view of the mark 210. As shown in FIG. 6, the mark 210 in an example has a square, substantially square, rectangular, or substantially rectangular outer shape. The length, in the main scanning direction Y, of an outer contour of the mark 210, and the length, in the sub scanning direction X, of the outer contour of the mark 210, are predefined. In this preferred embodiment, one pair of sides 210Y of the mark 210 facing each other extend in the main scanning direction Y, and are parallel or substantially parallel to the direction in which each of the ink lines of the first test pattern 221 through the eighth test pattern 228 extends. The other pair of sides 210X of the mark 210 facing each other extend in the sub scanning direction X, and are parallel or substantially parallel to the direction in which the ink lines of each of the first test pattern 221 through the eighth test pattern 228 are arranged side by side; in other words, parallel or substantially parallel to the longitudinal direction of each of the first test pattern 221 through the eighth test pattern 228.

Figure 6:
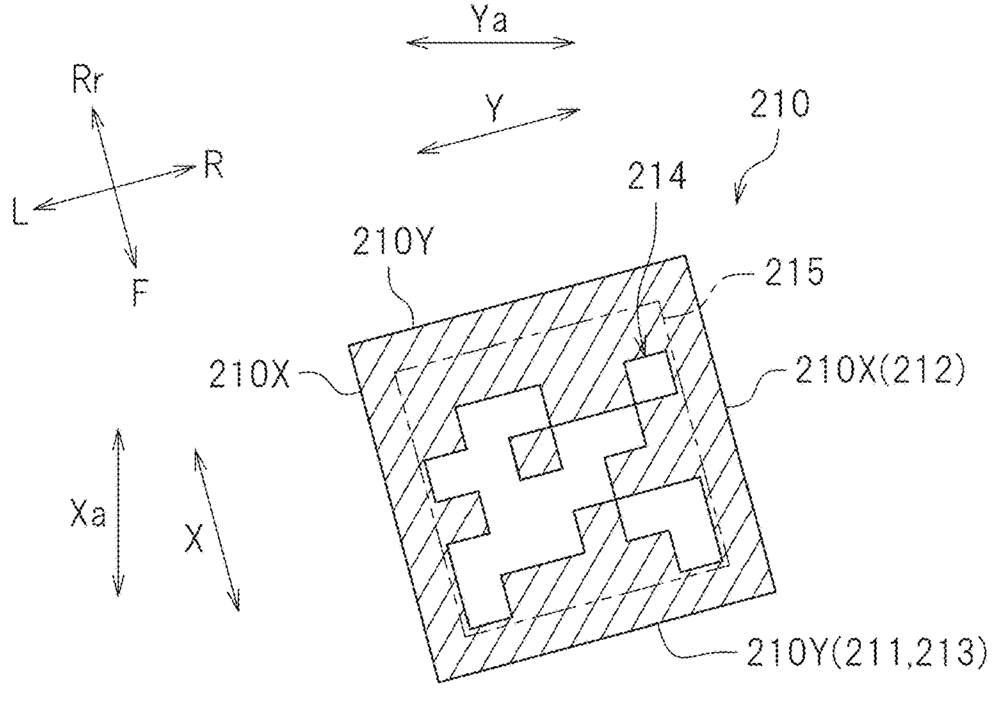
FIG. 6 is a plan view of a mark.

As shown in FIG. 6, in this example, the sides 210Y of the mark 210 extending in the main scanning direction Y are set as the first comparison portion 211, based on which the length in the main scanning direction Y is to be corrected. The sides 210X of the mark 210 extending in the sub scanning direction X are set as the second comparison portion 212, based on which the length in the sub scanning direction X is to be corrected. The sides 210Y of the mark 210 extending in the main scanning direction Y are also set as the third comparison portion 213, based on which the inclination is to be corrected. In this example, the third comparison portion 213 includes the same sides as those of the first comparison portion 211. Alternatively, the third comparison portion 213 may include the same sides as those of the second comparison portion 212, or may be different from the first comparison portion 211 and the second comparison portion 212. The mark 210 merely needs to include a line extending by a predefined length in a predefined direction and another line extending by a predefined length in a direction crossing the predefined direction. The mark 210 is not limited to being square, substantially square, rectangular, or substantially rectangular.

In this preferred embodiment, the mark 210 includes letter information. In this preferred embodiment, the mark 210 includes the model display portion 214 including letter information representing the model of the printer 10. In the case of having a simple structure, the model display portion 214 may represent, for example, a numerical character. In this case, association of various models and various numerical characters is predefined in the database. It should be noted that there is no specific limitation on the structure of the model display portion 214. The mark 210 does not need to include the model display portion 214 in the case where it is not necessary to specify the colors of the first test pattern 221 through the eighth test pattern 228.

Alternatively, the mark 210 may include a portion representing the order of colors in the test pattern 220. More specifically, the mark 210 may include a color display portion 215 (represented by the two-dot chain line in FIG. 6, but not shown in detail) representing the colors of the ink to be supplied by the ink supply device 60 and the positions of each of the colors in the test pattern 220. The test image printer 101 may cause the mark 210 including the color display portion 215 to be printed. The color display portion 215 may include letter information representing the order of the colors in the test pattern 220. In this case, the color specifier 107 may specify the position of each color in the test pattern 220 based on the image of the color display portion 215 captured by the image capturing device 70.

As shown in FIG. 4, in step S02 next to step S01, the image of the test image 200 is captured by the image capturing device 70. Hereinafter, the image captured by the image capturing device 70 will be referred to also as a "captured image" in order to be clearly distinguished from an image formed of ink. In step S03, the length, in the main scanning direction Y, of the captured image of the first comparison portion 211 captured by the image capturing device 70 is compared against the predefined length, in the main scanning direction Y, of the first comparison portion 211, and the first correction value, with which the length, in the main scanning direction Y, of the captured image of the test pattern 220 is to be corrected, is calculated.

In the case where, for example, the length of the first comparison portion 211 is set to 10 mm, and the length of the first comparison portion 211 in the captured image is 12 mm, the first correction value (10/12), with which the length of the first comparison portion 211 in the captured image is converted from 12 mm to 10 mm, is determined by a calculation. Alternatively, the first correction value (12/10), with which the length of the first comparison portion 211 is regarded as 12 mm, is determined by a calculation. In either case, the length, in the main scanning direction Y, of the captured image of the test pattern 220 is corrected based on the first correction value.

In step S04, the length, in the sub scanning direction X, of the captured image of the second comparison portion 212 captured by the image capturing device 70 is compared against the predefined length, in the sub scanning direction X, of the second comparison portion 212, and the second correction value, with which the length, in the sub scanning direction X, of the captured image of the test pattern 220 is to be corrected, is calculated. The length, in the sub scanning direction X, of the captured image of the test pattern 220 is corrected based on the second correction value. As a result of steps S03 and S04, the size and the distortion of the shape of the captured image of the test pattern 220 are corrected.

In step S05, the extension direction of the captured image of the third comparison portion 213 captured by the image capturing device 70 is compared against the predefined extension direction (in this preferred embodiment, the main scanning direction Y) of the third comparison portion 213, and the third correction value, with which the inclination of the captured image of the test pattern 220 is to be corrected, is calculated. In FIG. 6, a direction that is set as the main scanning direction Y in the pre-correction captured image is represented with "Ya", and a direction that is set as the sub scanning direction X in the pre-correction captured image is represented with "Xa". As shown in FIG. 6, the main scanning direction Y and the direction Ya, and the sub scanning direction X and the direction Xa, may possibly be deviated from each other. The third correction value is a value of angle. The inclination of the captured image of the test pattern 220 is corrected based on the third correction value. Steps S03 through S05 may be performed in any order.

In step S06, the coordinates of the predefined region where the test pattern 220 is to be printed are corrected with the calculated correction values (in this preferred embodiment, the first correction value, the second correction value and the third correction value), and the region where the test pattern 220 is present in the captured image captured by the image capturing device 70 is specified. In the actual test image 200, the coordinates representing the four corners of each of the first test pattern 221 through the eighth test pattern 228 based on the mark 210 (distances, in the main scanning direction Y and the sub scanning direction X, from the mark 210) are predefined. The directions, in the main scanning direction Y and the sub scanning direction X, of lines connecting the four corners, the length of the lines in the main scanning direction Y, and the length of the lines in the sub scanning direction X are respectively corrected with the third correction value, the first correction value and the second correction value. Thus, the region where the test pattern 220 is present in the captured image captured by the image capturing device 70 is specified. FIG. 5 shows a case where region R3 where the third test pattern 223 is present in the captured image is specified.

The region where the test pattern 220 is present in the captured image needs to be specified for the following reason. It is now assumed that due to an injection error of a nozzle NZ, the outermost contour of the region where the test pattern 220 is present is missing. This case cannot be distinguished from the case where there is originally no such contour, unless the region where the test pattern 220 is present in the captured image is specified. If these cases are not distinguished from each other, it cannot be specified which nozzle NZ causes the injection error. By contrast, as long as the region where the test pattern 220 is present in the captured image is specified, even if the outermost contour of the region where the test pattern 220 is present is missing due to an injection error of a nozzle NZ, it is specified which nozzle NZ causes the injection error.

In step S07, the model of the printer 10 is specified based on the captured image of the model display portion 214 captured by the image capturing device 70. In step S08, the order of the colors in the test pattern 220 is specified based on the specified model of the printer 10 and the information on the positional arrangement in the test pattern 220 registered in the database in association with each of various models. Unless the region where each color is present in the test pattern 220 is specified, there occurs a need to analyze the color of each of the first test pattern 221 through the eighth test pattern 228 based on the captured image captured by the image capturing device 70. A reason for this is that the determination on whether an ink line is present or absent may be different color by color (for example, the threshold value for the determination is different). Steps S07 and S08 are performed in order to eliminate analyzing the color of each of the first test pattern 221 through the eighth test pattern 228 based on the captured image captured by the image capturing device 70 and thus to shorten the time for inspection.

In step S09, the state of the plurality of nozzles NZ is inspected based on the corrected captured image of the test pattern 220. In this preferred embodiment, the defective nozzle ratio of each of the first test pattern 221 through the eighth test pattern 228 is calculated. In this preferred embodiment, the captured image of the test pattern 220 has been corrected. Therefore, in the case where there is a nozzle NZ causing an injection error, it is possible to specify such a nozzle NZ.

In step S10, one of the plurality of levels of cleaning registered in the cleaning level register 108 is selected in accordance with the state of the nozzles NZ determined by the inspection performed in step S09. The defective nozzle ratio is categorized into one of a plurality stages. As the defective nozzle ratio is higher, more thorough cleaning is selected. In an example, in the case where the defective nozzle ratio is lower than a first threshold value, the cleaning is not performed. In the case where the defective nozzle ratio is higher than or equal to the first threshold value and lower than a second threshold value, cleaning including only flushing by the recording head 50 is selected. In the case where the defective nozzle ratio is higher than or equal to the second threshold value and lower than a third threshold value, cleaning including the ink suctioning, the flushing and the wiping is selected. This is merely an example.

In step S11, the recording head 50 is cleaned at the level selected in step S10. In this manner, automatic inspection of the state of the nozzles NZ and automatic cleaning on the recording head 50 are realized. Therefore, high-level printing is performed even when the user is away from the printer 10. Although not shown, the state of the nozzles NZ may be inspected again after the cleaning. The results of the first inspection on the nozzles NZ and the results of the second inspection on the nozzles NZ may be transmitted to the user. In the case where the state of the nozzles NZ is not improved even after the cleaning is performed, the user may be notified of such a situation. In this case, the printer 10 may wait for an instruction of the user on whether or not to continue the printing.

Hereinafter, the functions and the effects provided the printer 10 according to the present preferred embodiment will be described.

The printer 10 according to this preferred embodiment includes the recording head 50 including the plurality of nozzles NZ to inject ink toward the recording medium 5, the image capturing device 70 to capture an image of the recording medium 5, and the controller 100. The controller 100 is configured or programmed to include the test image printer 101, the image capturer 102, the corrector 103 and the inspector 104. The test image printer 101 controls the recording head 50 to print, on the recording medium 5, the test image 200, including the mark 210 of a predefined shape usable to correct an image captured by the image capturing device 70 and the test pattern 220 usable to inspect the state of the plurality of nozzles NZ. The image capturer 102 controls the image capturing device 70 to capture an image of the test image 200 printed on the recording medium 5. The corrector 103 compares the image of the mark 210 captured by the image capturing device 70 against the predefined shape of the mark 210 to calculate a correction value, and corrects the image of the test pattern 220, captured by the image capturing device 70, based on the correction value. The inspector 104 inspects the state of the plurality of nozzles NZ based on the image of the test pattern 220 corrected by the corrector 103.

With the printer 100 having such a structure, the incorrectness of the image of the test pattern 220 is corrected with the correction value calculated by a comparison of the image of the mark 210 captured by the image capturing device 70 and the predefined shape of the mark 210. Therefore, the printer 10 according to this preferred embodiment suppresses an influence of the incorrectness of the captured image and inspects the state of the nozzles NZ more precisely.

In this preferred embodiment, the mark 10 includes the first comparison portion 211 having a predefined length in the main scanning direction Y and the second comparison portion 212 having a predefined length in the sub scanning direction X. The first corrector 103A in the corrector 103 compares the length, in the main scanning direction Y, of the image of the first comparison portion 211 captured by the image capturing device 70 to the predefined length, in the main scanning direction Y, of the first comparison portion 211 to calculate the first correction value, with which the length, in the main scanning direction Y, of the image of the test pattern 220 is to be corrected. The second corrector 103B compares the length, in the sub scanning direction X, of the image of the second comparison portion 212 captured by the image capturing device 70 against the predefined length, in the sub scanning direction X, of the second comparison portion 212 to calculate the second correction value, with which the length, in the sub scanning direction X, of the image of the test pattern 220 is to be corrected. With such a structure, the size and the distortion of the shape of the image of the test pattern 220 captured by the image capturing device 70 are corrected.

In this preferred embodiment, the mark 210 includes the third comparison portion 213 having a predefined extension direction. The third corrector 103C in the corrector 103 compares the extension direction of the image of the third comparison portion 213 captured by the image capturing device 70 against the predefined extension direction of the third comparison portion 213 to calculate the third correction value, with which the inclination of the image of the test pattern 220 is to be corrected. With such a structure, the inclination of the captured image of the test pattern 220 is corrected.

In this preferred embodiment, the corrector 103 includes the region specifier 103D to correct the coordinates of the predefined region where the test pattern 220 is to be printed, with the calculated correction values, and specify the region where the test pattern 220 is present in the image captured by the image capturing device 70. With such a structure, even in the case where the outermost contour of the region where the test pattern 220 is present is missing due to an injection error of a nozzle NZ, it is specified which nozzle NZ causes the injection error, for the above-described reason.

The printer 10 according to this preferred embodiment includes the ink supply device 60 supplying ink of a plurality of colors to the recording head 50. The mark 210 includes the model display portion 214 representing the model of the printer 10, and the test image printer 101 causes the mark 210 including the model display portion 214 to be printed. The model specifier 106 specifies the model of the printer 10 based on the image of the model display portion 214 captured by the image capturing device 70. The color specifier 107 specifies the positions of the colors (in this preferred embodiment, the positions of the first test pattern 221 through the eighth test pattern 228) in the test pattern 220 based on the model of the printer 10 specified by the model specifier 106 and the information on the positional arrangement of the colors in the test pattern 220 registered in the database in association with each of various models. With such a structure, there is no need for the process of analyzing the color of each of the test patterns 221 through 228 based on the captured image captured by the image capturing device 70, and thus the time for inspection is shortened.

In this preferred embodiment, the recording head 50 includes the plurality of nozzle columns 51 through 58 each including plural nozzles NZ among the plurality of nozzles NZ. The test image printer 101 forms the mark 210 by stacking ink injected from the nozzles NZ in two or more nozzle columns among the plurality of nozzle columns 51 through 58. With such a structure, the possibility that a portion of the mark 210 is missing due to an injection error of a nozzle NZ is decreased or prevented.

The printer 10 according to this preferred embodiment includes the cleaning device to clean the recording head 50. The controller 100 is configured or programmed to include the cleaning level register 108, the cleaning level selector 109, and the cleaning controller 110. In the cleaning level register 108, a plurality of levels of cleaning to be performed by the cleaning device are registered. The cleaning level selector 109 selects one of the plurality of levels of cleaning registered in the cleaning level register 108, in accordance with the state of the plurality of nozzles NZ determined by the inspection performed by the inspector 104. The cleaning controller 110 controls the cleaning device to clean the recording head 50 at the level selected by the cleaning level selector 109. With such a structure, the cleaning of a level appropriate to the state of the nozzles NZ is performed. Therefore, a situation is avoided in which unnecessarily thorough cleaning is performed and thus time is wasted. Such control is made possible because the state of the nozzles NZ is accurately determined by the correction on the captured image.

Other Preferred Embodiments

Preferred embodiments of the present invention are described above. The above-described preferred embodiments are merely examples, and the technology disclosed herein may be carried out in any of various other preferred embodiments.

For example, in the above-described preferred embodiments, the mark 210 has a two-dimensional shape occupying a part of the recording medium 5. Alternatively, the mark 210 may have a one-dimensional shape formed of a necessary line. The printer 10 merely needs to correct the captured image of the test pattern in a necessary range, and does not need to perform all the corrections described above.

The inkjet printer is not limited to having the above-described structure. For example, the inkjet printer does not need to be a so-called roll-to-roll type inkjet printer, which performs printing on a roll-like recording medium on a platen. The inkjet printer may be, for example, a so-called flat bed type inkjet printer, which performs printing on a recording medium placed on a movable table.

The above-described correction and inspection on the test pattern may be performed by an inspection device separate from the inkjet printer printing the test image. The preferred embodiments do not limit the present invention unless otherwise specified.

The terms and expressions used herein are for description only and are not to be interpreted in a limited sense. These terms and expressions should be recognized as not excluding any equivalents to the elements shown and described herein and as allowing any modification encompassed in the scope of the claims. The present invention may be embodied in many various forms. This disclosure should be regarded as providing preferred embodiments of the principles of the present invention. These preferred embodiments are provided with the understanding that they are not intended to limit the present invention to the preferred embodiments described in the specification and/or shown in the drawings. The present invention is not limited to the preferred embodiments described herein. The present invention encompasses any of preferred embodiments including equivalent elements, modifications, deletions, combinations, improvements and/or alterations which can be recognized by a person of ordinary skill in the art based on the disclosure. The elements of each claim should be interpreted broadly based on the terms used in the claim, and should not be limited to any of the preferred embodiments described in this specification or referred to during the prosecution of the present application.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inkjet printer, comprising:

a recording head including a plurality of nozzles to inject ink toward a recording medium;

an image capturing device to capture an image of the recording medium;

a controller; and an ink supplier to supply ink of a plurality of colors to the recording head; wherein the controller is configured or programmed to include:

a test image printer to control the recording head to print, on the recording medium, a test image including a mark of a predefined shape usable to correct an image captured by the image capturing device and a test pattern usable to inspect a state of the plurality of nozzles, the mark including a model display portion representing a model of the inkjet printer;

an image capture controller to control the image capturing device to capture an image of the test image printed on the recording medium;

a corrector to compare the image of the mark captured by the image capturing device against the predefined shape of the mark to calculate a correction value, and correct the image of the test pattern, captured by the image capturing device, based on the calculated correction value;

an inspector to perform an inspection to inspect the state of the plurality of nozzles based on the image of the test pattern corrected by the corrector;

a model specifier to specify the model of the inkjet printer based on the image of the model display portion captured by the image capturing device; and a color specifier to specify positions of the colors in the test pattern based on the model specified by the model specifier and information on a positional arrangement of the colors in the test pattern registered in a database in association with each of models of the inkjet printer.

2. The inkjet printer according to claim 1, wherein the mark includes:

a first portion with a first predefined length in a predetermined first direction; and a second portion with a second predefined length in a second direction crossing the first direction;

the corrector includes:

a first corrector to compare a length, in the first direction, of the image of the first portion captured by the image capturing device against the first predefined length, in the first direction, of the first portion to calculate a first correction value, with which the length, in the first direction, of the image of the test pattern is to be corrected; and a second corrector to compare a length, in the second direction, of the image of the second portion captured by the image capturing device against the second predefined length, in the second direction, of the second portion to calculate a second correction value, with which the length, in the second direction, of the image of the test pattern is to be corrected.

3. The inkjet printer according to claim 2, wherein the mark includes a third portion with a predefined extension direction; and the corrector includes a third corrector to compare an extension direction of the image of the third portion captured by the image capturing device against the predefined extension direction of the third portion to calculate a third correction value, with which an inclination of the image of the test pattern is to be corrected.

4. The inkjet printer according to claim 1, wherein the corrector further includes a region specifier to correct coordinates of a predefined region where the test pattern is to be printed, with the calculated correction values, to specify a region where the test pattern is present in the image captured by the image capturing device.

5. The inkjet printer according to claim 1, further comprising an ink supplier to supply ink of a plurality of colors to the recording head; wherein the mark includes a color display portion representing the colors of the ink supplied by the ink supplier and positions of the colors in the test pattern, and the test image printer causes the mark to be printed; and the controller is configured or programmed to include a color specifier to specify the positions of the colors in the test pattern based on the image of the color display portion captured by the image capturing device.

6. The inkjet printer according to claim 1, wherein the recording head includes a plurality of nozzle columns each including plural nozzles among the plurality of nozzles; and the test image printer is operable to form the mark by stacking ink injected from the nozzles in two or more nozzle columns among the plurality of nozzle columns.

7. The inkjet printer according to claim 1, further comprising a cleaner to clean the recording head; wherein the controller is configured or programmed to include:

a register in which a plurality of levels of cleaning to be performed by the cleaner is registered;

a selector to select one of the plurality of levels of cleaning registered in the register, in accordance with the state of the plurality of nozzles determined by the inspection performed by the inspector; and a cleaning controller to control the cleaner to clean the recording head at a level of the plurality of levels selected by the selector.

* * * * *